A. D. MORRIS.
METALLIC PACKING.
APPLICATION FILED JULY 1, 1920.

1,426,493.

Patented Aug. 22, 1922.

INVENTOR
Alfred Dillon Morris
BY
Robert M. Barr
ATTORNEY

UNITED STATES PATENT OFFICE.

ALFRED DILLON MORRIS, OF PHILADELPHIA, PENNSYLVANIA, ASSIGNOR TO THE MORRIS METALLIC PACKING CO., OF PHILADELPHIA, PENNSYLVANIA, A CORPORATION OF PENNSYLVANIA.

METALLIC PACKING.

1,426,493.     Specification of Letters Patent.     Patented Aug. 22, 1922.

Application filed July 1, 1920. Serial No. 393,439.

*To all whom it may concern:*

Be it known that I, ALFRED DILLON MORRIS, a subject of the King of Great Britain, and a resident of Philadelphia, county of Philadelphia, State of Pennsylvania, have invented certain new and useful Improvements in Metallic Packing, of which the following is a specification.

Some of the objects of the present invention are to provide means for preventing pressure fluid leakage about piston rods for engines, pumps, compressors, or any other parts to be maintained tight under pressure; to provide a metallic packing having means for breaking the pressure and preventing leakage; to provide metallic packing rings having means to equalize wear and maintain tight joints at all times; to provide a metallic packing including a floating pressure breaking ring operating in conjunction with the packing to maintain a pressure tight joint; and to provide other improvements as will hereinafter appear.

Figure 1:
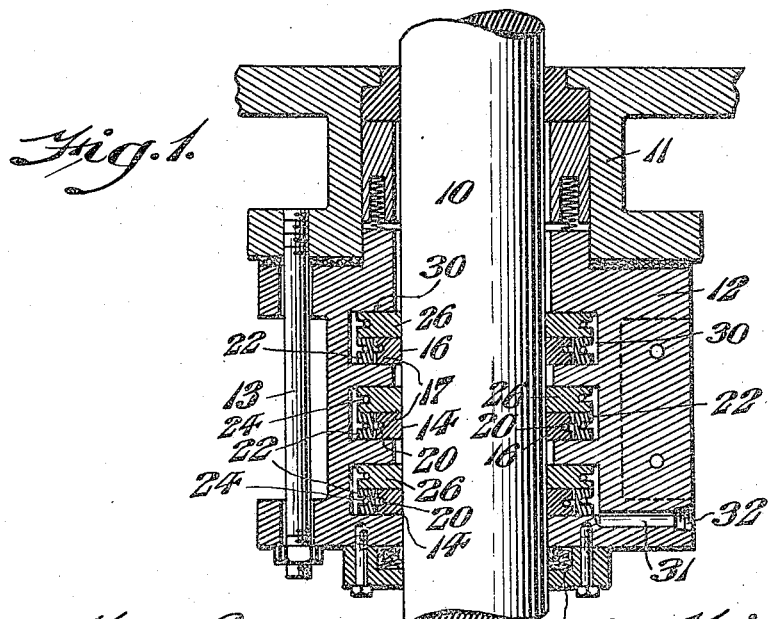
Figures 2, 3:
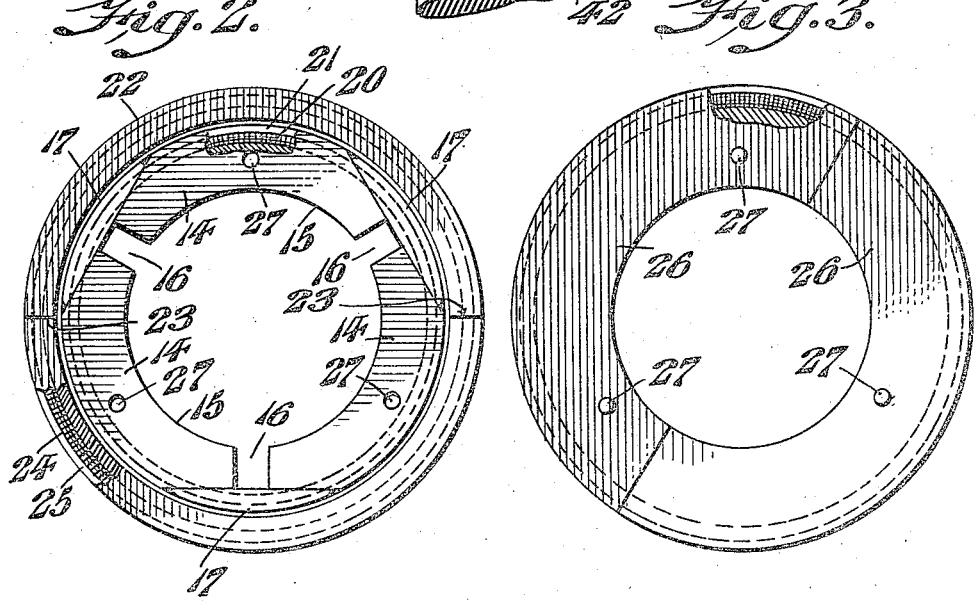

In the accompanying drawings, Fig. 1 represents a longitudinal section of a packing case in position upon a shaft, showing one form of the present invention in metallic packing; Fig. 2 represents an end elevation of one of the packing rings embodying the present invention; and Fig. 3 represents an end elevation of one of the packing retaining rings.

Referring to the drawings, a piston rod 10 is shown passing through a stuffing box 11, of any well known form, to which a packing case 12 is arranged to be secured in a fixed manner by bolts 13, or any other fastening devices, so that it encircles the rod 10.

For the purpose of preventing steam from leaking along the joint between the rod 10 and the packing case 12 a packing ring 14 is provided, preferably being formed in sections, which in assembled condition form an opening 15 of substantially the same diameter as the diameter of the rod 10. These ring sections 14 are also of a length, circumferentially considered, to form clearance spaces 16 between the opposed ends of the sections, so that wear can be automatically taken up, these spaces 16 being closed against leakage by caps 17 which are arranged to respectively bridge the spaces 16 and seat upon the meeting ends of the sections 14. In the present instance the seats for the caps 17 are formed as flat ground surfaces to form a leak-tight joint, and the outer faces of the caps 17 are curved to substantially conform to the contour of the ring sections 14. The parts of the ring 14 are held in assembled condition by a spring 20, which seats in a circumferential groove 21 to normally hold the packing elements in position.

For breaking the pressure and preventing leakage by way of the joints of the packing ring 14 a pressure breaking ring 22 is provided and arranged in encircling relation about the ring 14, though its inner diameter is such as to leave a circumferential clearance about the packing 14. This ring 22 may be of continuous or sectional construction but in the present instance it is shown as formed in two half segments the meeting ends 23 of which are ground to form a closely sealed joint and the parts are held fast together by an annular coiled spring 24 which seats in a circumferential groove 25 of the ring parts. The function of the ring 22 is to relieve the packing ring 14 of pressure tending to crowd it against the rod or other moving part to which the packing is applied. This is accomplished by making the ring 22 a floating one encircling the packing ring 14, and subject to the direct pressure of any fluid leaking past the stuffing box 11 and around the outer circumference of packing members.

For retaining the packing ring 14 and pressure breaking ring 22 in proper alinement and breaking the joints otherwise exposed to leakage of pressure, a packing ring 26 of any well known form may be provided, the same being preferably located on the pressure side of the packing 14 and secured thereto by laterally arranged dowel pins 27 which serve to prevent relative turning between the two rings 14 and 26.

The rings 14 and 26 are mounted in a groove 30 cut in the inner circumference of the case 12 and having a depth sufficient to receive the combined width of the rings 14 and 22 and leave a clearance about the outer periphery thereof by which escaped pressure fluid is directed against the floating pressure breaking ring 22. This clearance also allows the rod 10 and the packing rings 14 and 26 to move freely without binding. The width of the case groove 30 is such as to receive the two rings 14 and 26 side by side with a snug fit at the sides though still allowing the proper freedom of turning movement if required.

From the foregoing it will be apparent that any pressure fluid escaping along the rod 10 from the stuffing box 11 will find its way outwardly around the packing ring 26 and into the groove 30 where its pressure is directed inwardly and broken by the floating ring 22, thus not only preventing escape of pressure by way of the joints in this ring 14, but also eliminating direct pressure on the ring 14. In this manner all the packing ring parts are held in steam-tight relation, while the packing rings are relatively free to move about the rod 10.

While in the foregoing description but one set of packing rings embodying the present invention has been described it will be evident that a plurality of them may be employed to form a multiple packing and in practice this is the preferred arrangement. Such a multiple form is illustrated in Fig. 1 and all duplicate parts here have corresponding numbers of reference applied thereto.

As a means for draining the case 12 a hole 31 is bored through the case 12 and has a screw threaded plug 32 which normally seals the hole 31 but may be removed, as will be understood.

The end of the case 12 may have a swab box 42 secured thereto for purposes of lubrication though this is ordinarily unnecessary as the pressure fluid carries sufficient oil from the cylinder for the purpose.

Having thus described my invention, I claim:

1. In a metallic packing, a segmental packing ring, means for yieldingly holding said ring assembled as a unit, a supplemental pressure breaking ring encircling and floating about said packing ring, and a case having a groove to receive both of said rings.

2. In a metallic packing, a segmental packing ring, means for yieldingly holding said ring assembled as a unit, a ring arranged to abut one side of said segmental ring, means to prevent relative turning movement between said rings, a supplemental pressure breaking ring encircling said segmental packing ring in substantially floating relation, and a case having a groove to receive all of said rings.

3. In a metallic packing, a packing ring arranged to encircle a rod, a floating pressure breaking ring encircling said packing ring and providing a clearance therebetween, a case having a groove to receive said rings, said groove having a circumferential clearance about said rings, and a retaining ring abutting said first packing ring at one side.

4. In a metallic packing, a case having a plurality of internal circumferential grooves, a metallic packing means in each groove comprising a pair of segmental rings, means for yieldingly holding said rings in assembled condition, and a floating pressure breaking ring encircling one of said segmental rings and providing a clearance therebetween.

Signed at Philadelphia, county of Philadelphia, State of Pennsylvania, this 18th day of June, 1920.

ALFRED DILLON MORRIS.